United States Patent
Hasegawa et al.

(10) Patent No.: US 8,704,878 B2
(45) Date of Patent: Apr. 22, 2014

(54) IMAGE DISPLAY APPARATUS AND IMAGE DISPLAY METHOD

(75) Inventors: Hiroshi Hasegawa, Chino (JP); Akihiko Yamamoto, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 799 days.

(21) Appl. No.: 12/426,687

(22) Filed: Apr. 20, 2009

(65) Prior Publication Data

US 2009/0268016 A1 Oct. 29, 2009

(30) Foreign Application Priority Data

Apr. 23, 2008 (JP) .................................. 2008-112146

(51) Int. Cl.
*H04N 13/04* (2006.01)
(52) U.S. Cl.
USPC .............. 348/51; 348/42; 348/43; 348/44; 348/45; 348/46; 348/47; 348/48; 348/49; 348/50; 348/52; 348/53; 348/54; 348/55; 348/56; 348/57; 348/58; 348/59; 348/60
(58) Field of Classification Search
USPC ..................................................... 348/42–60
See application file for complete search history.

(56) References Cited

U.S. PATENT DOCUMENTS

| | | | |
|---|---|---|---|
| 6,400,364 B1 * | 6/2002 | Akisada et al. | 345/427 |
| 2007/0176852 A1 | 8/2007 | Yokosawa | |
| 2007/0296644 A1 * | 12/2007 | Hong et al. | 345/4 |
| 2007/0296920 A1 * | 12/2007 | Mezouari et al. | 353/7 |
| 2009/0066858 A1 * | 3/2009 | Turner et al. | 348/744 |

FOREIGN PATENT DOCUMENTS

| | | |
|---|---|---|
| JP | 04-240993 A | 8/1992 |
| JP | 2003-057595 A | 2/2003 |
| JP | 2003-287711 A | 10/2003 |
| JP | 2007-163901 A | 6/2007 |
| JP | 2007-288317 | 11/2007 |
| JP | 2008-003172 | 1/2008 |
| JP | 2008-268858 | 11/2008 |

* cited by examiner

*Primary Examiner* — Liangche A Wang
*Assistant Examiner* — Cheikh Ndiaye
(74) *Attorney, Agent, or Firm* — Maschoff Brennan

(57) ABSTRACT

An image display apparatus for displaying an image of an object on a screen by using a projector includes a three-dimensional image display unit having a plurality of screens overlaid but spaced apart from one another, each of the screens diffusing and reflecting part of the light incident thereon and transmitting the remainder of the light, and an image projection unit having a plurality of projectors, each of the projectors is assigned to the corresponding one of the screens and projects an image of the object on the screen. The image projection unit displays a three-dimensional image of the object in the three-dimensional image display unit by projecting on the screens the shapes of the object in sectioning positions corresponding to the positions of the screens.

7 Claims, 7 Drawing Sheets

IMAGE DISPLAY APPARATUS AND IMAGE DISPLAY METHOD

BACKGROUND

1. Technical Field

The present invention relates to a technology for displaying an image by using a projector.

2. Related Art

Advances of today's image-related technologies are remarkable, and any flat image can be displayed on a large screen at significantly high definition. Further, a variety of technologies that allow unaided eyes with no special glasses to view a three-dimensional image that gives a sense of depth have been developed.

For example, it is a known fact that we achieve a sense of depth by using the difference in vision between the left and right eyes (what is called parallax). Taking advantage of the above fact, JP-A-2008-003172 proposes a technology that allows unaided eyes to view a three-dimensional image that gives a sense of depth by preparing a left-view image and a right-view image and simultaneously projecting the left-view image from the left and the right-view image from the right on a screen, such as a folding screen, having irregularities provided at fine intervals.

It is known that we also use brightness information to achieve a sense of depth. To this end, two translucent screens are overlaid but spaced apart by a predetermined distance, and an image showing the same scene is projected on the two screens, the one on the near side and the other one on the remote side. In this setting, a near subject in the image is projected on the near screen at higher brightness, whereas the same subject is projected on the remote screen at lower brightness. Conversely, a remote subject in the image is projected on the remote screen at higher brightness, whereas the same subject is projected on the near screen at lower brightness. JP-A-2007-288317 proposes such a technology for displaying a three-dimensional image that gives a sense of depth by displaying the same image on near and remote screens but changing the brightness of the images on the two screens.

The proposed technologies of the related art, however, are problematic in that it is still difficult to display a three-dimensional image without any sense of strangeness. Such a sense of strangeness likely becomes more significant when an enlarged image is displayed. The reason for this follows: First, to achieve a sense of depth, we combine a variety of types of information, for example, not only the parallax and brightness information but also information associated with focusing operation that the eyes perform when viewing an object, orientation of the eyeballs (what is called the angle of convergence), and change in vision when the view point is shifted (what is called motion parallax). Therefore, when a sense of depth is expressed based on a certain type of information (parallax between the left and right eyes, for example), the viewer notices a discrepancy between the sense of depth obtained from the above certain type of information and that obtained from another type of information (brightness, for example), resulting in a sense of strangeness. Further, when an enlarged image is displayed, the angle at which the viewer looks at a central part of the image greatly differs from the angle at which the viewer looks at a periphery of the image. It is therefore difficult for the viewer to achieve a sense of depth at the periphery. As a result, the viewer recognizes a large discrepancy between the two types of sense of depth, and sometimes feels a significant sense of strangeness.

SUMMARY

An advantage of some aspects of the invention is to provide a technology for displaying a three-dimensional image that does not give any sense of strangeness and readily displaying even an enlarged image.

To solve at least part of the problems described above, an image display apparatus of an aspect of the invention employs the following configuration. That is, an image display apparatus includes:

a plurality of screens overlaid but spaced apart from one another, each of the screens diffusing and reflecting part of the light incident thereon and transmitting the remainder of the light, and a plurality of projectors each of which is assigned to the corresponding one of the screens, the plurality of projectors adapted to display a three-dimensional image of an object in the plurality of screens by projecting on the screens the shapes of the object in sectioning positions corresponding to the positions of the screens.

An image display method of another aspect of the invention corresponds to the image display apparatus described above is directed to display an image of an object on a screen by using a projector. The image display method includes:

disposing a plurality of screens to be overlaid but spaced apart from one another, each of the screens diffusing and reflecting part of the light incident thereon and transmitting the remainder of the light, and projecting images of the object on the screens using a plurality of projectors, each of the projectors being assigned to the corresponding one of the screens, wherein the projecting of images of the object includes displaying a three-dimensional image of the object by projecting on the screens the shapes of the object in sectioning positions corresponding to the positions of the screens.

In the image display apparatus and the image display method of the above aspects of the invention, a plurality of screens, each of which diffuses and reflects part of the light incident thereon and transmits the remainder of the light, are overlaid but spaced apart from one another. The projectors are then used to project images of an object on the screens. The image projected on each of the screens shows the shape of the object in the section corresponding to the position of the screen.

In this way, the shape of the object in each section is projected on the corresponding one of the plurality of screens overlaid but spaced apart from one another. Further, since each of the screens used in the apparatus diffuses and reflects part of the incident light and transmits the remainder of the light, a viewer can recognize not only the shapes projected on the screens on the near side, when viewed from the viewer, but also the shapes projected on the screens on the remote side all at once. The viewer can therefore very readily understand the three-dimensional shape of the object by combining the shapes projected on the screens.

The thus displayed three-dimensional image is obtained by displaying images on a plurality of screens disposed at intervals in the depth direction instead of achieving a sense of depth by using a flat image along with human illusion. Therefore, the displayed image do not cause any discrepancy among them in terms of multiple types of information that the viewer uses to achieve a sense of depth, for example, parallax between the left and right eyes, focusing operation that the eyes perform when viewing an object, the angle of convergence of the eyes, motion parallax, and sizes. As a result, a significantly natural three-dimensional image can be displayed. Since the images are simply displayed on the screens positioned at intervals in the depth direction, there will, of course, be no sense of strangeness even when the images are enlarged. Additionally, since what is displayed on each of the screens is a simple two-dimensional image, displaying a three-dimensional image is significantly easy irrespective of the size of the image to be displayed.

In the image display apparatus and the image display method of the above aspects of the invention, even when an object made of an opaque material is displayed, images projected on the screens on the remote side are visible through the screens on the near side, unlike the real object. However, since each of the screens used in the apparatus diffuses and reflects part of the incident light, the light is attenuated whenever it passes through a screen until it reaches the viewer. Therefore, the image projected on a screen becomes dimmer than the image displayed on the screen upstream thereof when viewed from the viewer. Since such an effect enhances a sense of distance, a three-dimensional shape will not be difficult to understand even when images on the remote side are visible.

In the image display apparatus of the above aspect of the invention, a three-dimensional image of an object may be displayed in the following manner: First, three-dimensional shape data of the object are stored in advance. Data representing the relative positions of the screens (screen position data) are also stored in advance. The coordinate system of the three-dimensional shape data are converted into the coordinate system of the screen position data, or vice versa. In the conversion, the magnification, the position and the angle of the object, and other parameters can be set. After shape data in the sectioning position corresponding to the position of each of the screens are generated based on the converted three-dimensional shape data and the screen position data, the resultant shape data may be supplied to the corresponding projector to project an image.

Three-dimensional shape data of an object can be readily generated, for example, by using design data. The shape data thus generated from the three-dimensional shape data are then supplied to the projectors and projected, whereby a three-dimensional image of the object at an arbitrary size or viewed from an arbitrary view point can be readily displayed. Since the viewer can look at the image of the object from an arbitrary view point, the viewer can very readily understand the three-dimensional shape even when it is complicated.

In the image display apparatus of the above aspect of the invention in which the shape data in the position of each of the screens are generated from the three-dimensional shape data, the position of at least one of the screens may be changeable, and the screen position data may be updated in response to the change of the position of the screen.

In this way, the shape of the object can be understood by shifting a screen to a position where the viewer wants to check the sectional shape. As a result, the three-dimensional shape of the object can be more readily understood.

The image display apparatus of the above aspect of the invention may be configured in such a way that at least one of the projectors can project an image with the outer surface of the object enhanced. To enhance the outer surface, a variety of methods can be used, including displaying the outer surface at higher brightness or with a different color.

In this way, the outer surface in a sectioning position where the viewer wants to check the shape can be enhanced and displayed, whereby the shape of the object can be more readily understood.

The image display apparatus of the above aspect of the invention may be configured in such a way that at least one of the projectors can project an image showing a sectional shape inside the object.

In this way, a three-dimensional image can be displayed in a mode in which a structure inside the object can be readily understood.

The image display apparatus of the above aspect of the invention may be configured in such a way that the three-dimensional image is also visible through a side of the plurality of stacked screens.

Since the three-dimensional image display unit does not display a three-dimensional image by using human illusion but by actually projecting images on the plurality of screens spaced apart from one another, a three-dimensional image can be displayed irrespective of the direction in which the image is observed. Therefore, when the three-dimensional image is visible through a side of the plurality of stacked screens, the viewer can more readily understand the three-dimensional shape by looking at the three-dimensional image through a side of the three-dimensional image display unit. Further, since the three-dimensional image can be observed at a variety of angles, the three-dimensional image can be presented to a large number of viewers at the same time.

The image display apparatus of the above aspect of the invention may be configured in such a way that the plurality of screens are disposed in a substantially vertical direction or the plurality of screens are disposed in a substantially horizontal direction.

When the screens are disposed in a substantially vertical direction, the viewer can face the screens when looking at an image, resulting in the most natural way of three-dimensional image observation. In contrast, when an object commonly viewed in a horizontal position, such as a map and a floor plan of a building, is displayed, screens disposed in a substantially horizontal direction allow the three-dimensional shape of the object to be displayed in a readily understandable way.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments will be described below in the following order to clarify the aspects of the invention described above.

A. Configuration of apparatus:
B. First embodiment:
C. Second embodiment:
D. Variations:
D-1. First variation:
D-2. Second variation:

A. Configuration of Apparatus

Figure 1A:
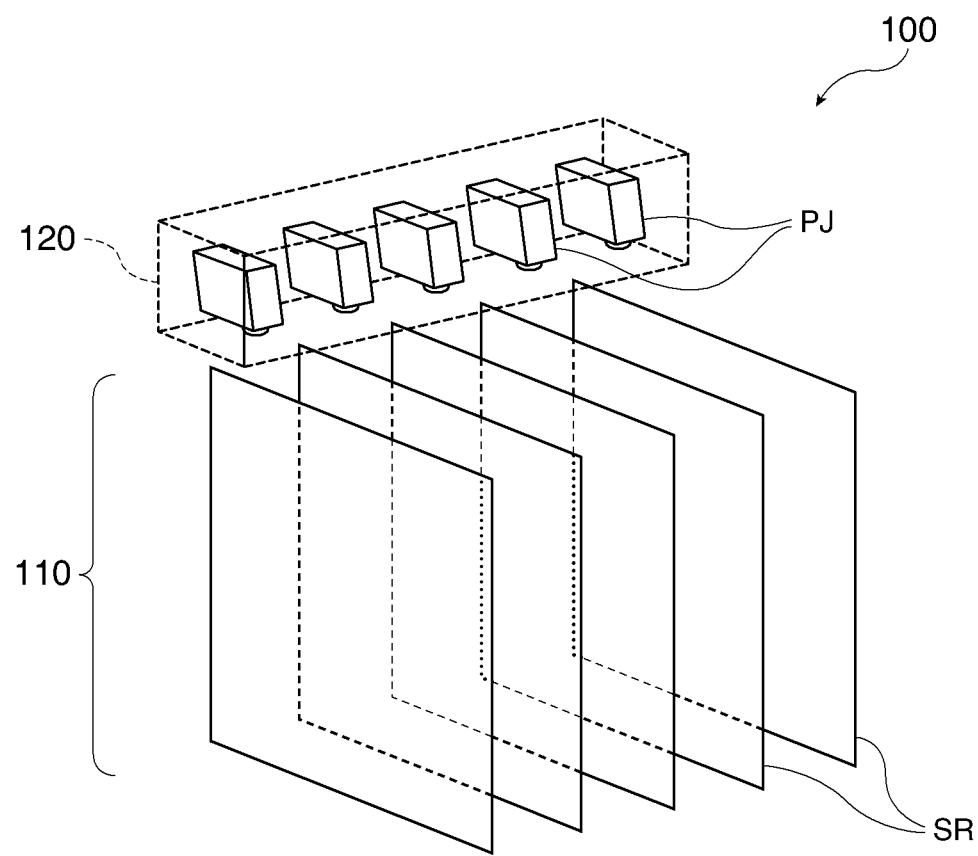
FIGS. 1A and 1B are descriptive diagrams showing a schematic configuration of an image display apparatus.
Figure 1B:
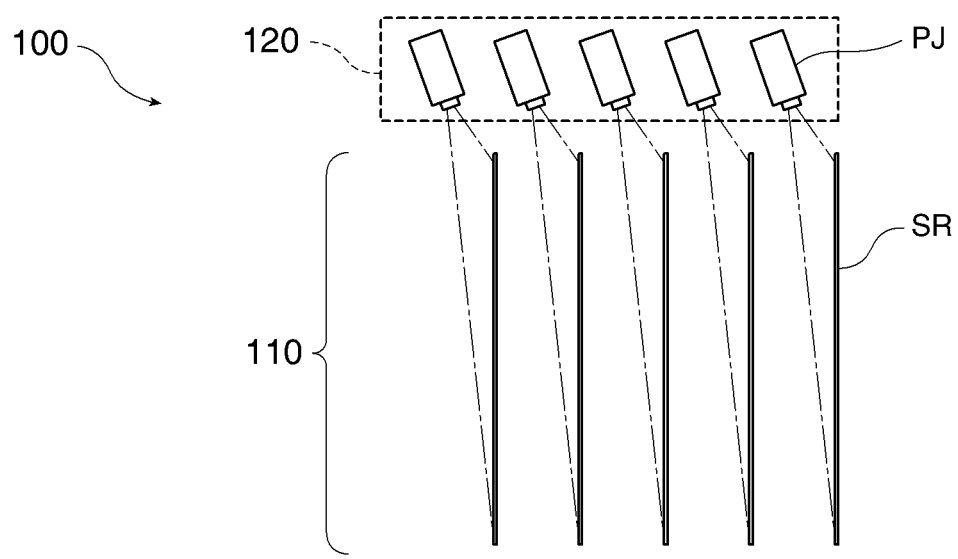

FIGS. 1A and 1B are descriptive diagrams showing a schematic configuration of an image display apparatus 100 of an embodiment. FIG. 1A is a perspective view showing the configuration of the image display apparatus 100 of the present embodiment. As shown in FIG. 1A, the image display apparatus 100 of the present embodiment includes a three-dimensional image display unit 110 that displays a three-dimensional image and an image projection unit 120 that projects images on the three-dimensional image display unit 110. The three-dimensional image display unit 110 has a plurality of screens SR overlaid but spaces apart from one another, and the image projection unit 120 has a plurality of projectors PJ, each of which obliquely projects an image on the corresponding screen SR.

The screen SR is a special screen that diffuses and reflects part of the light incident thereon and transmits the remainder of the light. The screen SR can be formed of an extremely thin fabric woven by using extremely thin fibers, a transparent film or plate having fine diffusing particles dispersed therein at a fixed low density, or a transparent film or plate on which tiny irregularities are formed at a fixed low density. The screen SR used in the image display apparatus 100 desirably transmits a greater proportion of the incident light and diffuses and reflects a smaller proportion thereof. In the present embodiment, the screen SR is formed of an extremely thin fabric woven by using extremely thin 7-denier fibers (7 denier represents the diameter of a fiber that weighs 7 gram per 9000 meters). Further, the screen SR used in the image display apparatus 100 desirably diffuses and reflects a greater proportion of the incident light as the angle of incidence with respect to a normal to the screen surface increases. From the viewpoint described above, a plain woven fabric formed of extremely thin fibers is suitable for the screen SR used in the image display apparatus 100.

In the image display apparatus 100 of the present embodiment, in which fabric screens SR are used, a plurality of screens SR is hanged from the shelf (not shown). Of course, when each screen SR is formed of a plate, the screens SR may stand on the floor or may be attached to a wall. In FIGS. 1A and 1B, the screens SR are disposed at substantially uniform intervals and substantially parallel to each other. It is noted that the screens SR are not necessarily disposed at uniform intervals or parallel to each other.

FIG. 1B shows the relative positions of the screens SR and the projectors PJ. As shown in FIG. 1B, each of the screens SR is assigned to a single projector PJ, and the plurality of projectors PJ form the image projection unit 120. The projector PJ can be any type of projector as long as it can project an image on the screen SR. For example, the projector PJ may be a projector that illuminates a positive-film slide with white light to project only one color image, or a projector that successively projects images in accordance with color image data.

The thus configured image display apparatus 100 of the present embodiment can display a three-dimensional image by projecting an image from each of the projectors PJ toward the corresponding screen SR, the image showing a sectional shape corresponding to the position of the screen SR. A description will be made of how to display a three-dimensional image.

B. First Embodiment

Figure 2:
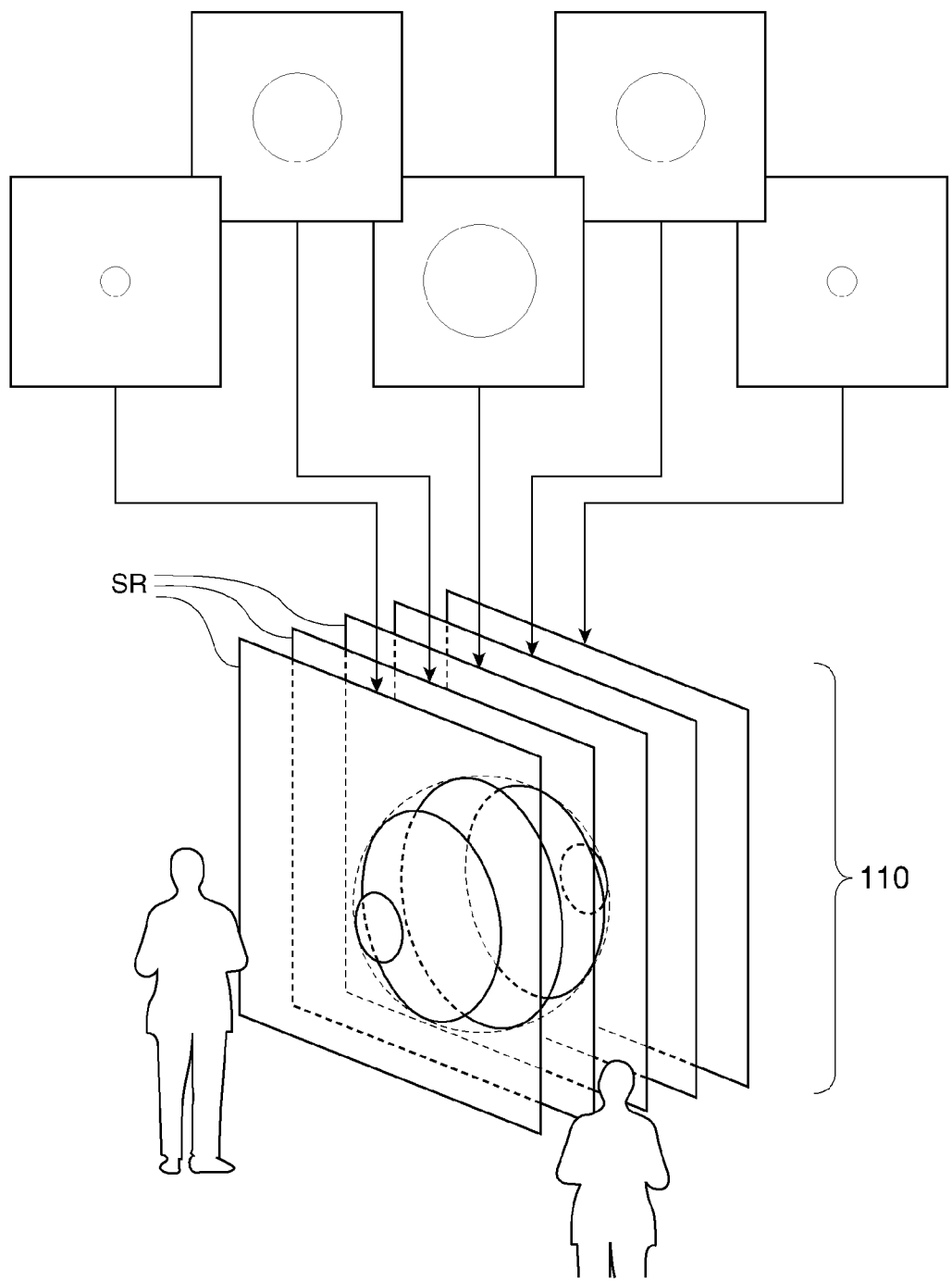
FIG. 2 is a descriptive diagram illustrating how the image display apparatus of the first embodiment is used to display a three-dimensional image.

FIG. 2 is a descriptive diagram showing how the image display apparatus 100 of the first embodiment is used to display a three-dimensional image. In the first embodiment, which employs the simplest display mode, the shape in each sectioning position is projected on the corresponding screen SR in the three-dimensional image display unit 110, and a viewer imaginarily combines the shapes to understand the three-dimensional shape. FIG. 2 illustrates only the three-dimensional image display unit 110, but omits the image projection unit 120 and the projectors PJ that form the image projection unit 120. FIG. 2 illustrates images projected on the screens SR in place of the image projection unit 120 and the projectors PJ.

As shown in FIG. 2, the image projected on each of the screens SR shows the outer shape of an object being displayed in the corresponding section. The image display apparatus 100 of the first embodiment simply projects these images on the respective screens SR in the three-dimensional image display unit 110. Nevertheless, each of the screens SR that form the three-dimensional image display unit 110 is a special screen that diffuses and reflects part of the incident light and transmits the remainder of the light, and the plurality of screens SR in the three-dimensional image display unit 110 are overlaid but spaced apart from one another, as described above. The viewer can therefore look at the images projected on the screens SR all at once. Additionally, since the relative spatial positions of the images on the screens SR are the same as those of the real object, the projected images do not cause any discrepancy among them in terms of multiple types of information that the viewer uses to reconstruct a three-dimensional image (for example, difference in size among the images, difference between the left and right fields of view, focusing operation performed by the eyes, the angle of convergence of the eyes, and motion parallax). As a result, the viewer can very readily understand the three-dimensional shape without suffering from a sense of strangeness at all.

Further, since the images projected on the screens SR are positioned in a spatially correct manner, the viewer can readily understand the three-dimensional shape without any problem even when the viewer looks at the images in the three-dimensional image display unit 110 in an arbitrary direction. Moreover, the three-dimensional image displayed in the three-dimensional image display unit 110 can be enlarged only by increasing the magnification at which the images are projected on the screens SR. In this case as well, since the images projected on the screens SR are positioned in a spatially correct manner, the viewer can readily understand the three-dimensional shape even when the images are enlarged.

When a three-dimensional image displayed in the three-dimensional image display unit 110 is viewed, unlike when a real three-dimensional object is viewed, sectional shapes of the object on the remote side are visible. This does not, however, give any sense of strangeness. The reason for this follows: First, since part of the light incident on a screen SR is diffused and reflected, the light is attenuated whenever it passes through a screen SR. The light will thus be dimmer when the light passes through a more remote screen SR. Therefore, even when sectional shapes of the object on the remote side are visible to the viewer, the sectional shapes are certainly more blurred than those on the near side, resulting in no confusion. Instead, the fact that sectional shapes of the object on the near side are readily visible and sectional shapes of the object on the remote side are also visible at the same time allows the viewer to much more readily understand the three-dimensional shape than looking at a real object. Further, at least one of projectors can display a certain section (or the outer shape in a certain section) at higher brightness or with a different color. In this way, an object having complicated sectional shapes is readily displayed and recognized.

In the image display apparatus 100 of the first embodiment, multiple sets of images may be stored in advance in each of the projectors PJ, and the projectors PJ may be driven in coordination with one another to successively project the images. A variety of three-dimensional shapes can thus be readily displayed. Alternatively, the projectors PJ may be driven in coordination with one another to project motion images. In this way, for example, a three-dimensionally shaped rotating image can be readily displayed.

Figure 3:
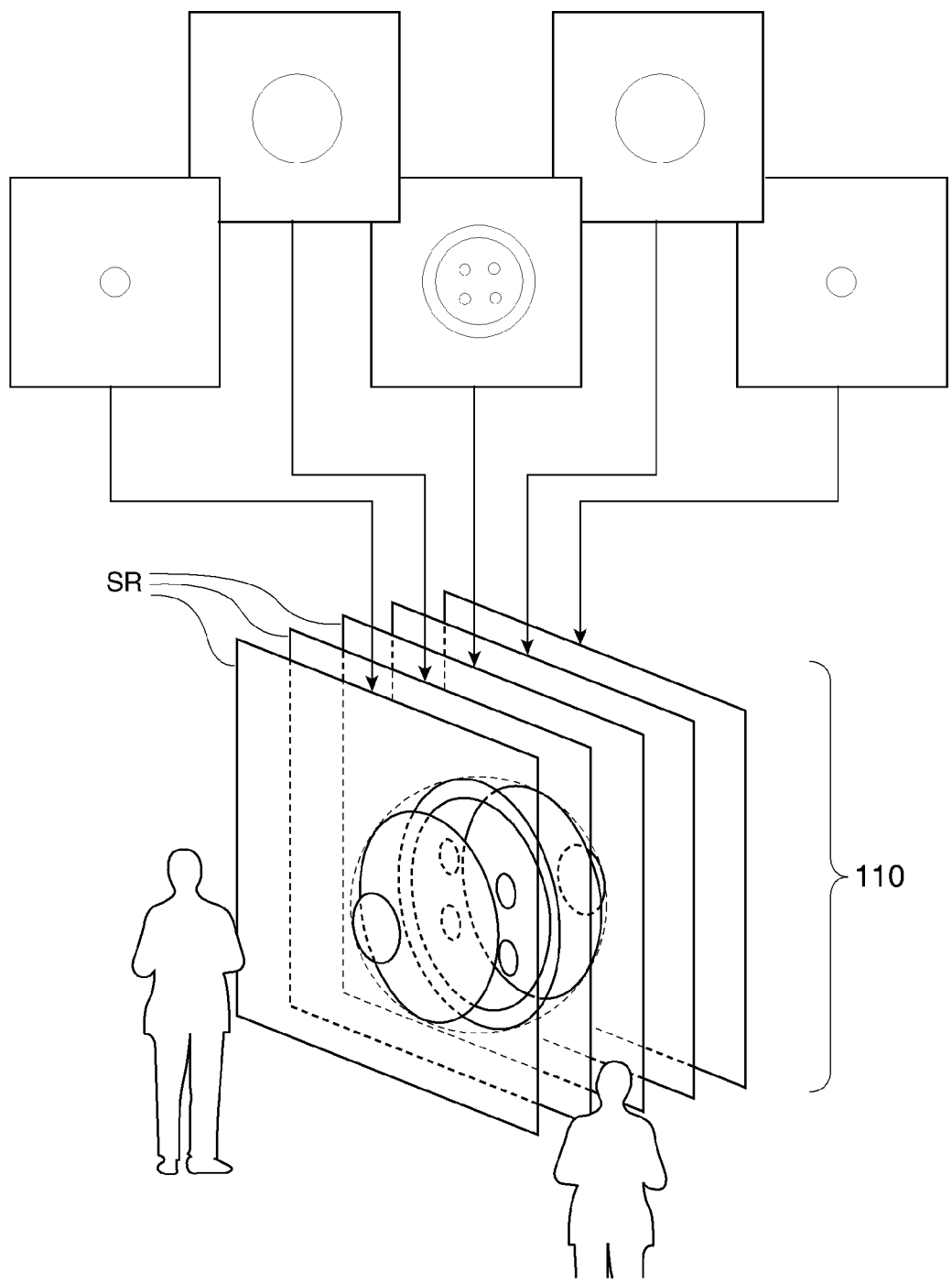
FIG. 3 is a descriptive diagram illustrating a three-dimensional image displayed in a mode that allows an internal structure to be understood.

Further, a three-dimensional image displayed in the three-dimensional image display unit 110 can present an internal structure of an object by taking advantage of the fact that sectional shapes on the remote side are visible. FIG. 3 is a descriptive diagram illustrating a three-dimensional shape displayed in a mode that allows an internal structure to be understood. In the example shown in FIG. 3, a sectional shape including an internal structure is displayed on one of the plurality of screens SR. Of course, two or more screens SR may display respective sectional shapes including internal structures. Alternatively, a screen SR on which an internal structure is displayed may be successively switched to another. A significantly natural image including internal structures of an object can be displayed three-dimensionally by displaying sectional shapes including the internal structures on the screens SR as described above.

C. Second Embodiment

In the image display apparatus 100 of the first embodiment described above, images prestored in the projectors PJ are simply projected and displayed on the screens SR, and the viewer understands the three-dimensional shape by simply looking at the displayed images. In contrast, it is possible to use an action from the viewer to change how a three-dimensional image is displayed. An image display apparatus 100 of a second embodiment having such a capability will be described below.

Figure 4:
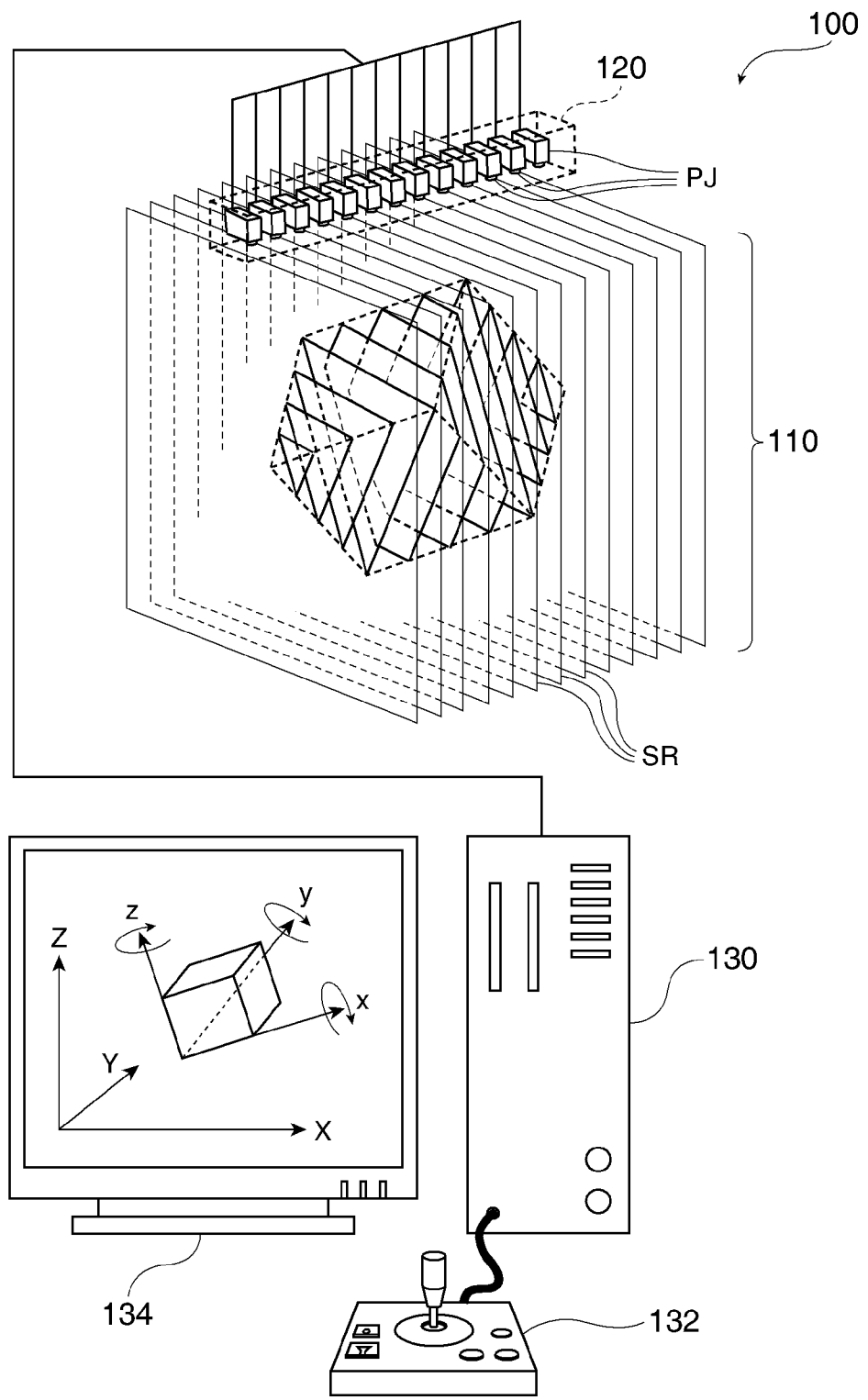
FIG. 4 is a descriptive diagram showing a schematic configuration of an image display apparatus of a second embodiment.

FIG. 4 is a descriptive diagram showing a schematic configuration of the image display apparatus 100 of the second embodiment. The image display apparatus 100 of the second embodiment also includes a three-dimensional image display unit 110 and an image projection unit 120, as in the image display apparatus 100 of the first embodiment described above. The three-dimensional image display unit 110 includes a plurality of screens SR, each of which diffuses and reflects part of the light incident thereon and transmits the remainder of the light, and the image projection unit 120 includes a plurality of projectors PJ that project images on the respective screens SR. In the image display apparatus 100 of the second embodiment, the projectors PJ are connected to an image display control unit 130, receive image data supplied from the image display control unit 130, and project the image data on the respective screens SR.

The image display control unit 130 is comprised of what is called a computer including a CPU, as the heart of the unit, a ROM, a RAM, a hard disk drive, and a network card and capable of communicating data among the above components via a bus. The image display control unit 130 stores three-dimensional shape data on an object, from which sectional shape data in an arbitrary sectioning position are generated and supplied to the corresponding projector PJ in the image projection unit 120. The projectors PJ then project images on the respective screens SR in accordance with the supplied sectional shape data. A three-dimensional image can thus be displayed in the three-dimensional image display unit 110. A controller 132 is connected to the image display control unit 130, and operating the controller 132 allows the images displayed in the three-dimensional image display unit 110 to be enlarged or reduced in size, reoriented, and rotated. Further, in the example shown in FIG. 4, it is possible to check on a monitor 134 the current orientation of the coordinate axes of the three-dimensional shape data stored in the image display control unit 130, in other words, the relationship between the coordinate axes (x axis, y axis, and z axis) of the three-dimensional shape data and the coordinate axes (X axis, Y axis, and Z axis) of the viewer (or the three-dimensional image display unit 110). Therefore, the viewer can freely change the size, orientation, and other parameters of the three-dimensional image displayed in the three-dimensional image display unit 110 by operating the controller 132 while checking the three-dimensional image on the monitor 134 at the same time. The viewer can thus more readily understand three-dimensional shape.

Figure 5:
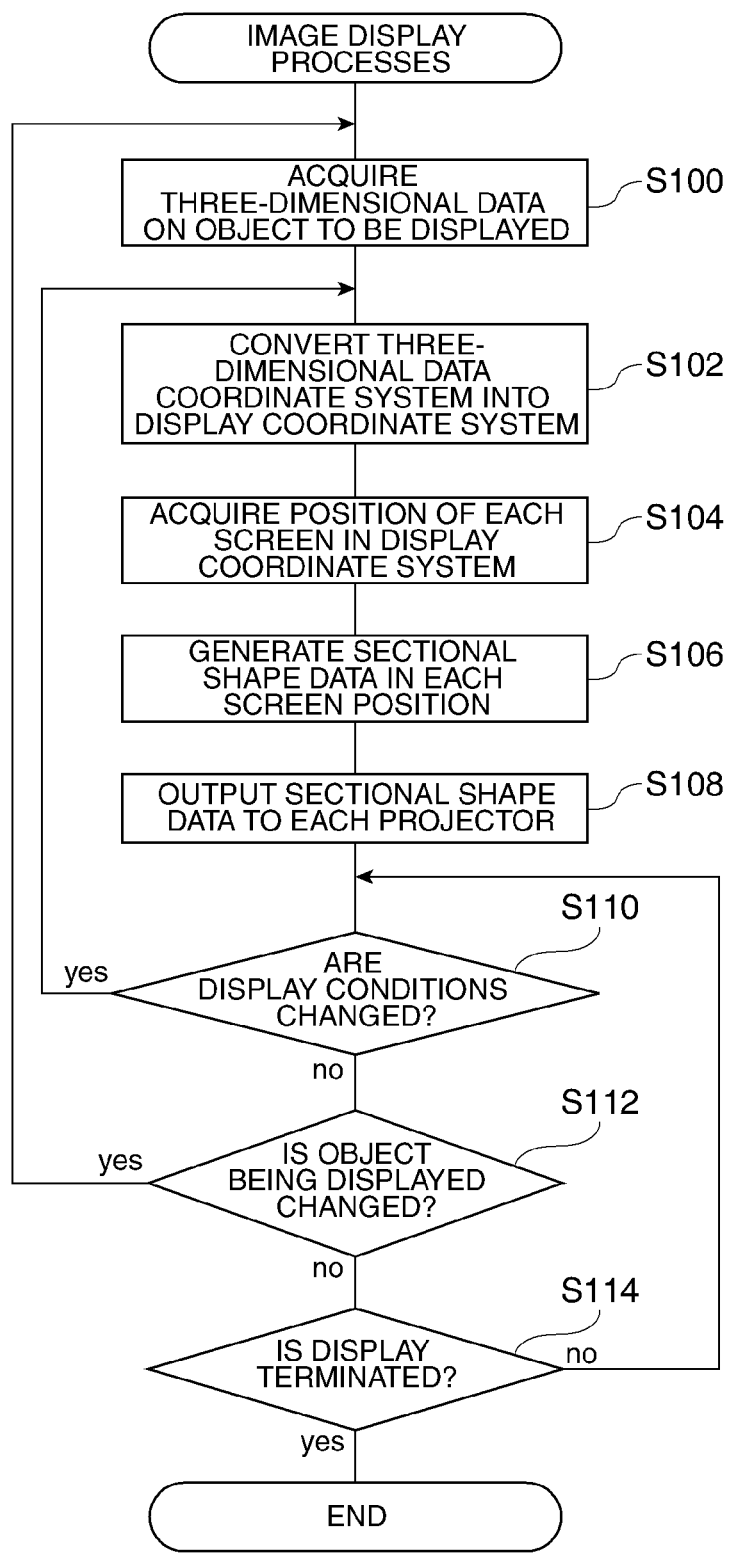
FIG. 5 is a flowchart showing the procedure of image display processes for displaying a three-dimensional image by using the image display apparatus of the second embodiment.

FIG. 5 is a flowchart showing the procedure of image display processes for displaying a three-dimensional image by using the image display apparatus 100 of the second embodiment. The processes are carried out by the CPU incorporated in the image display control unit 130 in response to the viewer's action on the controller 132.

When the image display processes are initiated, three-dimensional shape data on an object to be displayed in the three-dimensional image display unit 110 are acquired (step S100). The three-dimensional shape data have been stored in advance in the ROM, the hard disk drive, or other memories in the image display control unit 130. When the viewer operates the controller 132 and selects any of the three-dimensional shape data, the selected data are read and stored in the RAM.

The coordinate system of the thus read three-dimensional shape data is then converted into the coordinate system to be used for the display (display coordinate system) in the three-dimensional image display unit 110 (step S102). Examples of the conversion include scaling up or down the coordinate axes of the three-dimensional shape data in accordance with the size of an image to be displayed in the three-dimensional image display unit 110, rotating the three-dimensional shape data around any of the coordinate axes, and translating the three-dimensional shape data. Any of the conversion operations described above is simple linear conversion and can be very readily carried out. The details of any of the conversion operations are set through the controller 132 operated by the viewer.

After the positions of the screens SR provided in the three-dimensional image display unit 110 are acquired in the display coordinate system (step S104), sectional shape data in the position of each of the screens SR are generated based on the three-dimensional shape data (step S106). In this process, the viewer can specify by using the controller 132 whether data including only the outer shape of the section are generated or sectional-view data including not only the outer shape of the section but also an internal structure are generated.

The thus generated shape data in each section are outputted to the corresponding projector PJ in the image projection unit 120 (step S108). As a result, the sectional shape corresponding to the position of each of the screens SR is projected on the corresponding screen SR in the three-dimensional image display unit 110. A three-dimensional image is thus displayed.

After the three-dimensional image is displayed, it is then judged whether or not the display conditions are changed (step S110). In the second embodiment, when the viewer operates the controller 132, it is judged that the viewer has instructed to change the display conditions (step S110: yes). In this case, the control returns to the step S102, and then the following sequence of processes are carried out. The viewer's action on the controller 132 is thus immediately reflected in the display in the three-dimensional image display unit 110. Accordingly, since the viewer can not only look at a three-dimensional image displayed in the three-dimensional image display unit 110 without any sense of strangeness, but also freely change the view point and size of the image being displayed in the three-dimensional image display unit 110, the viewer can very readily understand even a complicated three-dimensional shape.

On the other hand, when it is judged that the display conditions for the image displayed in the three-dimensional image display unit 110 are not changed (step S110: no), it is then judged whether or not the object being displayed is changed (step S112). Changing the object being displayed is also carried out by operating the controller 132. When it is judged that the controller 132 has been instructed to change the object being displayed (step S112: yes), the control returns to the step S100 to read new three-dimensional shape data, and the following sequence of processes are carried out. As a result, a three-dimensional image of the object newly specified by the viewer is displayed in the three-dimensional image display unit 110.

On the other hand, when it is judged that the object being displayed is not changed (step S112: no), it is then judged whether or not the display is terminated (step S114). When the controller 132 has not been instructed to terminate the display processes (step S114: no), the control returns to the step S110, and the following judgments are repeatedly made: whether or not the display conditions are changed (step S110: yes), whether the object being displayed is changed (step S112: yes), and whether the display is terminated (step S114: yes). When the controller 132 is instructed to terminate the display (step S114: yes), the image display processes shown in FIG. 5 are terminated.

In the image display apparatus 100 of the second embodiment described above, since an image displayed in the three-dimensional image display unit 110 not only is significantly natural and three-dimensional, but also can be freely changed in terms of size, angle, orientation, and other display modes by viewer's actions, even a complicated three-dimensional shape can be very readily understood.

D. Variations

There are several variations of the image display apparatus 100 described above. The variations of the image display apparatus 100 will be briefly described below.

D-1. First Variation

Figure 6:
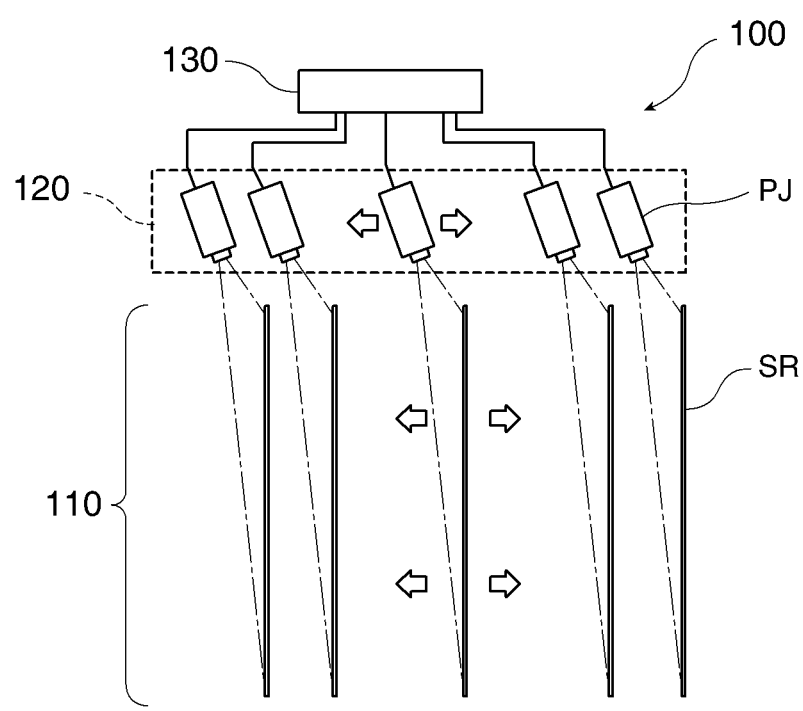
FIG. 6 is a descriptive diagram illustrating an image display apparatus of a first variation.

The above embodiments have been described by assuming that the positions of the screens SR are fixed. The positions of the screens SR may alternatively be shiftable. FIG. 6 illustrates an image display apparatus 100 of a first variation having such a capability. In the example shown in FIG. 6, a pair of a screen SR and a projector PJ is shiftable. The shape of a three-dimensional object can be appropriately displayed by inputting the position of the screen SR to the image display control unit 130. The viewer can therefore more readily understand the shape of the three-dimensional object by shifting the screen SR to a position where the viewer wants to display a sectional shape.

Appropriate screen SR intervals probably vary in accordance with the depth of an object to be displayed. Images to be projected on the screens SR may therefore be stored at appropriate intervals according to an object, and the positions of the screens SR may be shifted so that the screens SR are positioned at appropriate intervals in accordance with the images to be displayed in the three-dimensional image display unit 110.

To shift the screens SR, they are not necessarily translated, but can be shifted in a mode in which each of the screens SR is rotated around one end (upper end, for example) thereof.

D-2. Second Variation

Figure 7:
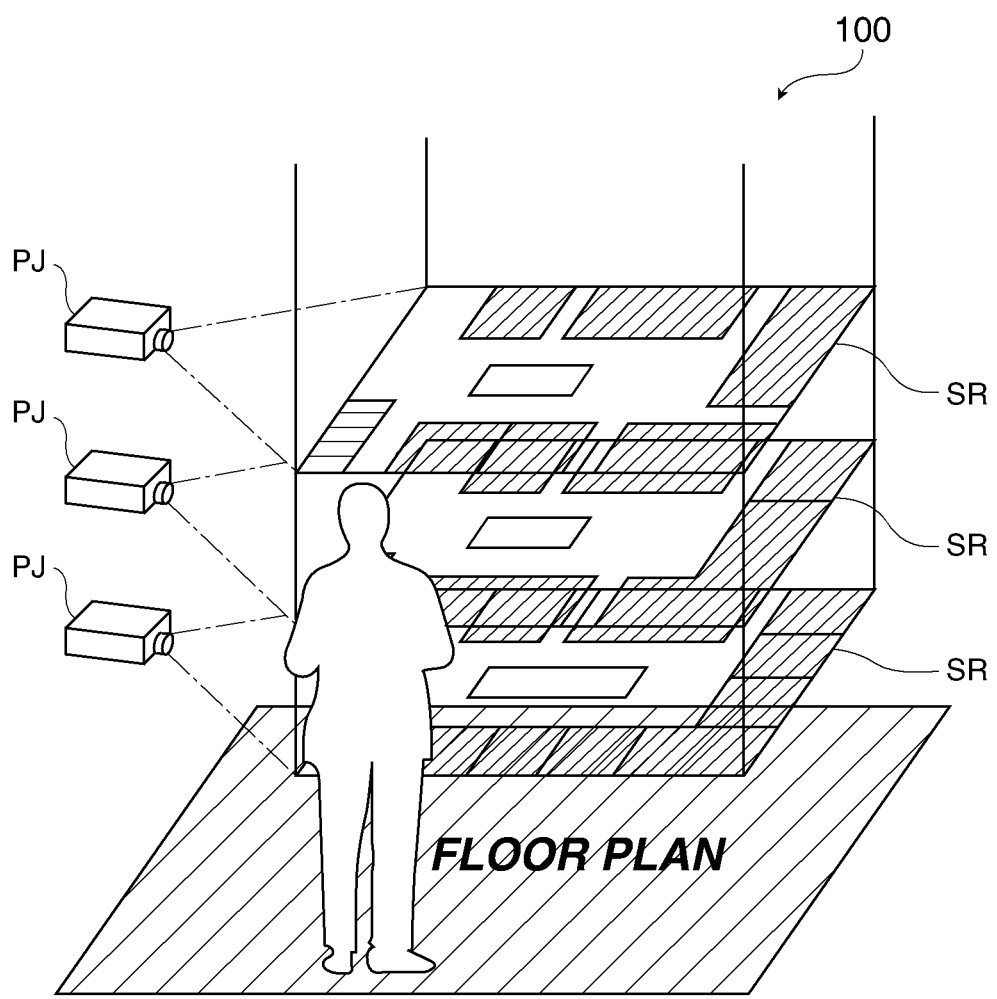
FIG. 7 is a descriptive diagram illustrating an image display apparatus of a second variation.

The above embodiments have been described by assuming that each of the screens SR is provided in such a way that the projection surface is substantially vertical. The projection surface of each of the screens SR is not necessarily vertical, but can be arbitrarily inclined. FIG. 7 is a descriptive diagram illustrating an image display apparatus 100 of a second variation. In the example shown in FIG. 7, a plurality of screens SR are vertically stacked but spaced apart from one another, and the projection surfaces are substantially horizontal. Even in such a case, a three-dimensional shape can be displayed by obliquely projecting an image from each of the projectors PJ onto the corresponding screen SR.

While a variety of image display apparatus have been described, the invention is not limited thereto. The invention can be implemented in a variety of aspects to the extent that they do not depart from the spirit of the invention.

The entire disclosure of Japanese Patent Application NO. 2008-112146, filed Apr. 23, 2008 is expressly incorporated by reference herein.

What is claimed is:

1. An image display apparatus comprising:
a plurality of screens overlaid but spaced apart from one another, each of the screens diffusing and reflecting part of the light incident thereon and transmitting the remainder of the light, each of the plurality of screens being comprised of a fabric which diffuses and reflects a greater proportion of the incident light as an angle of incidence with respect to a screen surface increases;
a plurality of projectors each of which is assigned to and positioned obliquely with reference to the corresponding one of the screens, the plurality of projectors adapted to display a three-dimensional image of an object in the plurality of screens by obliquely projecting on to a flat surface of the screens the shapes of the object in sectioning positions corresponding to the positions of the screens, wherein the plurality of projectors project directly onto the flat surface of the screens without having an optical component which reflects or diffuses the light therebetween;
a three-dimensional shape data storage section for storing three-dimensional shape data of the object;
a screen position data storage section for storing screen position data representing relative positions of the screens;
a coordinate system conversion section for converting the coordinate system of the three-dimensional shape data into the coordinate system of the screen position data and vice versa;

a conversion parameter setting section for setting parameters used when the coordinate system conversion section converts the coordinate system;

a shape data generation section for generating shape data of the object in the sectioning position based on the three-dimensional shale data and the screen position data that have been converted into the data in the same coordinate system;

a shape data supply section for supplying the shape data in each of the sectioning positions to the corresponding projector;

a screen position changing section for changing the position of at least one of the screens with respect to another of the screens such that the interval between the at least one of the screens and another of the screens varies, and a screen position data update section for updating the screen position data stored in the screen position storage section in response to the change of the position of the at least one screen.

2. The image display apparatus according to claim 1, wherein at least one of the projectors can project the shape of the object with the outer surface of the object enhanced.

3. The image display apparatus according to claim 1, wherein at least one of the projectors can project a sectional shape inside the object.

4. The image display apparatus according to claim 1, wherein the three-dimensional image is also visible through a side of the plurality of stacked screens.

5. The image display apparatus according to claim 1, wherein the plurality of screens are disposed in a substantially vertical direction.

6. The image display apparatus according to claim 1, wherein the plurality of screens are disposed in a substantially horizontal direction.

7. An image display method comprising:

disposing a plurality of screens to be overlaid but spaced apart from one another, each of the screens diffusing and reflecting part of the light incident thereon and transmitting the remainder of the light, each of the plurality of screens being comprised of a fabric which diffuses and reflects a greater proportion of the incident light as an angle of incidence with respect to a screen surface increases;

projecting images of an object on to a flat surface of the screens using a plurality of projectors, each of the projectors being assigned to and positioned obliquely with respect to the corresponding one of the screens, wherein the projecting of images of the object includes displaying a three-dimensional image of the object by obliquely projecting on the flat surface of the screens the shapes of the object in sectioning positions corresponding to the positions of the screens, wherein the plurality of projectors project directly onto the flat surface of the screens without having an optical component which reflects or diffuses the light therebetween;

storing, by a three-dimensional shape data storage section, three-dimensional shape data of the object;

storing, by a screen position data storage section, screen position data representing relative positions of the screens;

converting, by a coordinate system conversion section, the coordinate system of the three-dimensional shape data into the coordinate system of the screen position data and vice versa;

setting, by a conversion parameter setting section, parameters used when the coordinate system conversion section converts the coordinate system;

generating, by a shape data generation section, shape data of the object in the sectioning position based on the three-dimensional shape data and the screen position data that have been converted into the data in the same coordinate system;

supplying, by a shape data supply section, the shape data in each of the sectioning positions to the corresponding projector; and updating, by a screen position data update section, the screen position data stored in the screen position storage section in response to the change of the position of the at least one screen, wherein the position of at least one of the screens with respect to another of the screens is changed by a screen position changing section such that the interval between the at least one of the screens and another of the screens varies while the shapes of the object in sectioning positions are and continually changed so as to correspond with the positions of the screens.

* * * * *